US010415686B2

United States Patent
Sivanandan

(10) Patent No.: US 10,415,686 B2
(45) Date of Patent: Sep. 17, 2019

(54) V-BELT PULLEY CAPABLE OF ADJUSTING ALIGNMENT OF V-BELT AND CONTROL METHOD THEREOF

(71) Applicants: HYUNDAI MOTOR COMPANY, Seoul (KR); KIA MOTORS CORPORATION, Seoul (KR)

(72) Inventor: K. Sivanandan, Tamilnadu (IN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 175 days.

(21) Appl. No.: 15/405,943

(22) Filed: Jan. 13, 2017

(65) Prior Publication Data

US 2018/0202532 A1    Jul. 19, 2018

(51) Int. Cl.
| | | |
|---|---|---|
| *F16H 55/49* | (2006.01) | |
| *F16H 7/18* | (2006.01) | |
| *F16H 55/36* | (2006.01) | |

(52) U.S. Cl.
CPC ............... *F16H 55/49* (2013.01); *F16H 7/18* (2013.01); *F16H 2055/363* (2013.01)

(58) Field of Classification Search
CPC .............. B62G 39/16; G03G 15/755; G03G 2215/00156; F16H 7/02; F16H 7/18
USPC .......................... 474/166, 102, 106, 107, 108
See application file for complete search history.

(56) References Cited

U.S. PATENT DOCUMENTS

| | | | | |
|---|---|---|---|---|
| 1,963,099 A * | 6/1934 | Robins | ........... | B65G 39/16 198/808 |
| 3,518,739 A * | 7/1970 | Butler | ........... | G03G 15/755 399/288 |
| 4,518,374 A * | 5/1985 | Kanemitsu | ........... | B21D 53/261 29/892.3 |
| 4,840,607 A * | 6/1989 | Hitchcock | ........... | F16H 55/44 474/167 |
| 4,900,294 A * | 2/1990 | Schneeberger | ........... | F16H 7/02 474/167 |
| 4,929,219 A * | 5/1990 | Baker | ........... | F16H 7/18 474/102 |
| 5,467,171 A * | 11/1995 | Castelli | ........... | B65G 39/16 198/806 |
| 5,518,457 A * | 5/1996 | Seki | ........... | B31F 1/2831 474/102 |
| 5,967,925 A * | 10/1999 | Meckstroth | ........... | F16H 55/38 474/168 |
| 6,198,902 B1 * | 3/2001 | Vaughan | ........... | G03G 15/2064 399/165 |
| 6,200,036 B1 * | 3/2001 | Girardey | ........... | B65G 23/44 384/260 |

(Continued)

FOREIGN PATENT DOCUMENTS

| | | |
|---|---|---|
| JP | 06-307521 A | 1/1994 |
| JP | 2001-280433 A | 10/2001 |

(Continued)

*Primary Examiner* — Henry Y Liu
(74) *Attorney, Agent, or Firm* — Morgan, Lewis & Bockius LLP

(57) ABSTRACT

A V-belt pulley includes a plurality of rib guides projected along a circumferential surface of the V-belt pulley; and an alignment corrector that moves a V-belt in a direction towards an inside of the V-belt pulley when a rib of the V-belt is positioned outside of an outermost rib guide of the plurality of rib guides.

11 Claims, 17 Drawing Sheets

(56) References Cited

U.S. PATENT DOCUMENTS

| | | | | |
|---|---|---|---|---|
| 6,488,604 | B1 * | 12/2002 | Birn | F16H 55/49 |
| | | | | 29/892.11 |
| 7,237,638 | B2 * | 7/2007 | Ishikawa | F16H 9/18 |
| | | | | 180/219 |
| 7,252,610 | B2 * | 8/2007 | Miyata | F02B 67/06 |
| | | | | 123/90.31 |
| 7,806,253 | B2 * | 10/2010 | Graswinckel | G03G 15/755 |
| | | | | 198/806 |
| 8,351,830 | B2 * | 1/2013 | Kudo | B65G 39/16 |
| | | | | 198/810.03 |
| 2016/0138686 | A1 * | 5/2016 | Aoki | F16H 7/24 |
| | | | | 474/119 |

FOREIGN PATENT DOCUMENTS

| | | |
|---|---|---|
| KR | 1999-0049323 A | 7/1999 |
| KR | 10-2013-0006392 A | 1/2013 |

\* cited by examiner

--RELATED ART--

--RELATED ART--

V-BELT PULLEY CAPABLE OF ADJUSTING ALIGNMENT OF V-BELT AND CONTROL METHOD THEREOF

TECHNICAL FIELD

The present disclosure relates to a pulley transmitting power by using a belt transmitting power, and more particularly, to a V-belt pulley capable of adjusting alignment of a V-belt and a control method thereof that moves the V-belt to inside of the V-belt pulley and adjusts alignment state of the V-belt when a part of the V-belt being wound up the V-belt pulley and rotating with it is separated from the V-belt pulley.

BACKGROUND

Various means for transmitting power have been applied to various mechanical devices, including an engine of a vehicle. For example, the power of a driving pulley may be transmitted to a driven pulley using a belt and a pulley. Particularly, a V-belt has been widely applied, which can be operated at high speed and has good power transmission performance by making the cross section of the contact portion between the belt and the pulley to have a trapezoidal shape to increase the contact area between the belt and the pulley.

FIG. 1 shows a V-belt 120 and a V-belt pulley 110 upon which the V-belt 120 is wound.

A phenomenon may occur where the V-belt 120 is separated from the V-belt pulley 110 while being operated. For example, a part of the V-belt 120 may be separated from the V-belt pulley 110 while rotating when the V-belt 120 is improperly assembled onto the V-belt pulley 110 or for other reasons.

FIG. 2 shows a state where a part of a rib 121 of the V-belt 120 is positioned outside of an outermost rib guide 111 among the rib guides 111, where the rib 121 is formed to be inserted between the rib guides 111 in the V-belt pulley 110. Noise may be generated or insufficient power may be transmitted when the V-belt pulley 110 and the V-belt 120 are rotated with the state that the V-belt 120 is misaligned with the V-belt pulley 110, as described above. Furthermore, the V-belt 120 may be damaged or cut if this phenomenon continues for an extended period of time.

In addition, the engine may overheat because insufficient power may be transmitted through the V-belt 120 when the V-belt 120 and the V-belt pulley 110 are mounted at the engine of a vehicle to be used in order to drive auxiliary machinery and the V-belt 120 was rotated while being misaligned.

The foregoing is intended merely to aid in the understanding of the background of the present disclosure, and is not intended to mean that the present disclosure falls within the purview of the related art that is already known to those skilled in the art.

SUMMARY

The present disclosure has been made to address the above problems occurring in the related art, and the present disclosure is intended to propose a V-belt pulley capable of adjusting an alignment of a V-belt and a control method thereof which can adjust an alignment state of the V-belt by moving the V-belt to an inside of the V-belt pulley through an alignment corrector even if a rib of the V-belt wound around the V-belt pulley is separated from the V-belt pulley.

According to one aspect of the present disclosure, a V-belt pulley includes a plurality of rib guides projected along a circumferential surface of the V-belt pulley; and an alignment corrector that moves a V-belt in a direction towards an inside of the V-belt pulley when a rib of the V-belt is positioned outside of an outermost rib guide of the plurality of rib guides.

The alignment corrector may comprise: an alignment portion installed in an alignment portion installing groove formed at the V-belt pulley to be moved up and down and having an alignment guide for moving the V-belt toward the V-belt pulley; and a lever for raising the alignment portion when the V-belt is misaligned and the ribs of the V-belt contact the lever.

The alignment guide in the alignment portion may be formed such that a rib guide of the plurality of rib guides is connected to an adjacent rib guide of the plurality of rib guides.

The alignment guides may be formed in plural and the plurality of alignment guides may be arranged to be parallel to each other.

The number of the plurality of alignment guides may be one smaller than a number of the plurality of rib guides.

An elastic member may be installed at the alignment portion installing groove and may elastically support the alignment portion in a direction of descending the alignment portion.

The middle portion of the lever may be hinge-connected to a side surface of the V-belt pulley, one end portion of the lever may be connected to the alignment portion and the other end portion may be located adjacent to the circumferential surface of the V-belt pulley.

A circumferential surface of the other end portion of the lever may have a circular arc shape and may contact the rib of the V-belt when the rib is located outside of the V-belt pulley The V-belt pulley may further comprise a cover having a groove accommodating the one end portion of the lever to limit the rotation of the lever and being engaged outside of the V-belt pulley.

The alignment corrector may be provided at two positions apart from each other along the circumferential direction of the V-belt pulley, and may be installed to move the V-belt in directions opposite to each other.

The levers may be installed at opposite sides of the V-belt pulley, respectively, and the alignment guides of the alignment portions may be formed to move the V-belt in directions opposite to each other.

According to another aspect of the present disclosure, a control method of a V-belt pulley capable of adjusting an alignment of a V-belt comprises steps of: contacting a misaligned rib of a V-belt with a lever rotatably installed at an outside of the V-belt pulley to rotate the lever when a rib is located outside of a rib guide formed in a circumferential direction of the V-belt pulley; raising an alignment portion in an alignment portion installing groove formed at the V-belt pulley by the rotation of the lever; adjusting the alignment state of the V-belt by an alignment guide formed at an upper end of the alignment portion such that the V-belt moves toward an inside of the V-belt pulley through the raising of the alignment portion; and descending the alignment portion and returning the lever to an original position thereof when the alignment state of the V-belt is adjusted.

According to the V-belt pulley capable of adjusting alignment of the V-belt and a control method thereof including the above configuration, even if a rib of the V-belt is positioned at an outside of the V-belt pulley to be misaligned, the V-belt may be adjusted to be positioned at an inside of the V-belt pulley through an alignment corrector.

Since the V-belt is adjusted at an inside of the V-belt pulley through self-alignment, it is able to solve such problems as noise and V-belt damage by misalignment.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE EMBODIMENTS

Figure 1:
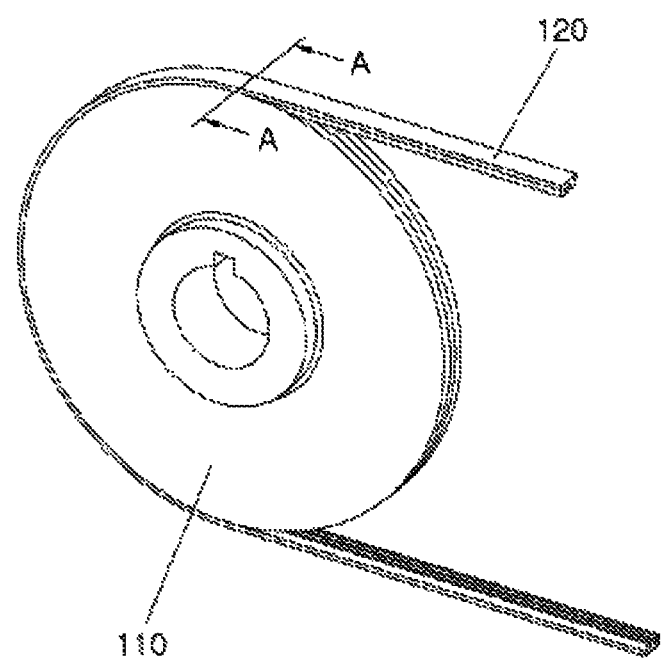
FIG. 1 is a perspective view illustrating a V-belt pulley and a V-belt according to the conventional art.

Hereinafter, a V-belt pulley capable of adjusting alignment of a V-belt according to exemplary embodiments in the present disclosure will be described in detail with reference to the accompanying drawings.

A V-belt pulley capable of adjusting alignment of a V-belt according to an exemplary embodiment in the present disclosure may include a plurality of rib guides 11 projected along a circumferential surface of a V-belt pulley 10 in order to be inserted between a plurality of ribs 21 formed at a V-belt 20, and an alignment corrector for moving the V-belt 20 in a direction where the plurality of rib guides 11 are formed, when any one of the plurality of ribs 21 is positioned to be misaligned at outside of the rib guide 11 formed at the outermost portion among the plurality of rib guides 11 of the V-belt pulley 10.

The cross-sectional surfaces of the V-belt pulley 10 and the V-belt 20 that contact each other may have a trapezoidal shape in order to increase the area contacting each other, so that these may be applied at high speed and transmit large power.

The plurality of ribs 21 may be formed at an inside surface of the V-belt 20 and the plurality of rib guides 11 may be formed at an outside surface of the V-belt pulley 10 in order for the plurality of ribs 21 to be inserted therebetween.

The rib guides 11 may be formed on the circumferential surface of the V-belt pulley 10 in a circumferential direction, and formed with a predetermined interval in an axial direction of the V-belt pulley 10.

The rib guides 11 may be inserted between the ribs, and slanted surfaces of the rib guides 11 may contact the slanted surfaces of the ribs 21 so that power transmission between the V-belt pulley 10 and the V-belt 20 can be possible.

Figure 2:
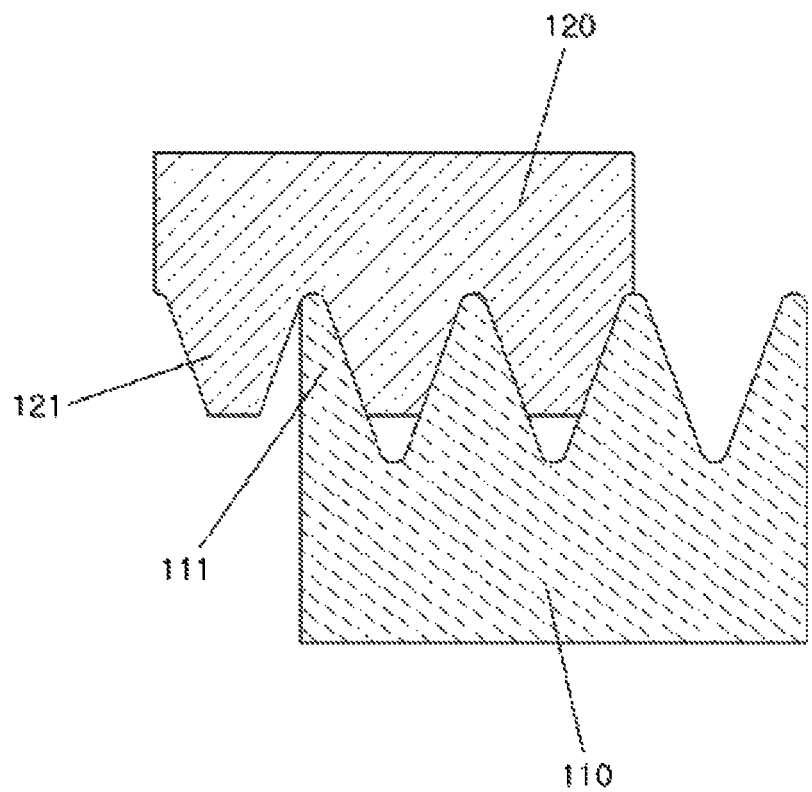
FIG. 2 is a cross-sectional view taken along the line A-A of the FIG. 1.

The alignment corrector for moving the V-belt 20 in an axial direction to be aligned may be provided at the V-belt pulley 10 when some ribs 21 among the ribs of the V-belt 20 are separated from the V-belt pulley 10 outside to be misaligned as shown in FIG. 2.

Figure 4:
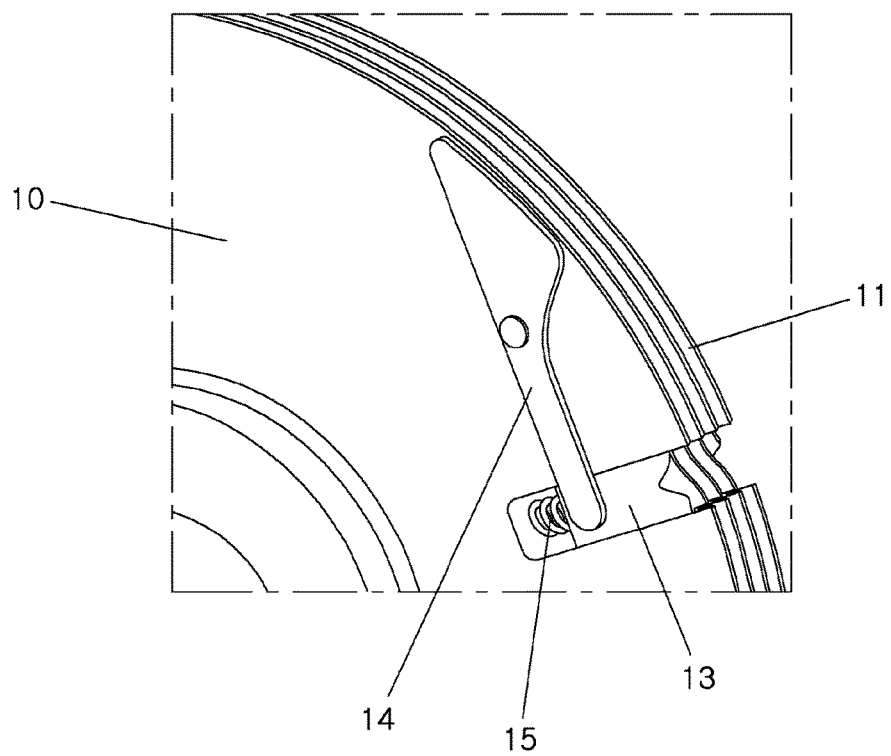
FIG. 4 is a partial enlarged perspective view of the V-belt pulley capable of adjusting alignment of the V-belt according to the present exemplary embodiment.

As shown in FIG. 4, the alignment corrector may be installed at one side of the V-belt pulley 10 and may move the V-belt 20 in an axial direction of the V-belt pulley 10 when some ribs 21 of the V-belt 20 are separated from the V-belt pulley 10.

Figure 5:
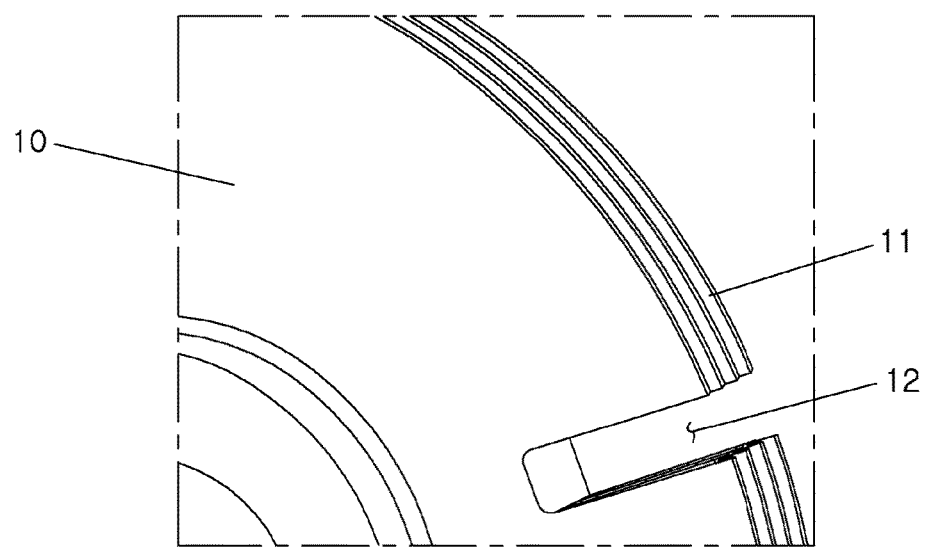
FIG. 5 is a partial enlarged perspective view illustrating an alignment portion installing groove in the V-belt pulley capable of adjusting alignment of the V-belt according to the present exemplary embodiment.

In order to install the alignment corrector, an alignment portion installing groove 12 may be formed at the V-belt pulley 10. As shown in FIG. 5, the alignment portion installing groove 12 may be formed from the circumference surface of the V-belt pulley 10 toward a center of the alignment portion installing groove 12 at a predetermined depth. It is desirable that the alignment portion installing groove 12 is formed of an equal cross sectional area along a length direction thereof in order for an alignment portion 13 to move up and down.

The alignment portion 13 may be installed to move up and down in the alignment portion installing groove 12. An alignment guide 13a having a shape similar to the rib guides 11 may be formed at an upper end of the alignment portion 13. The alignment guides 13a may be inserted into the ribs 21 of the V-belt 20.

Figure 6:
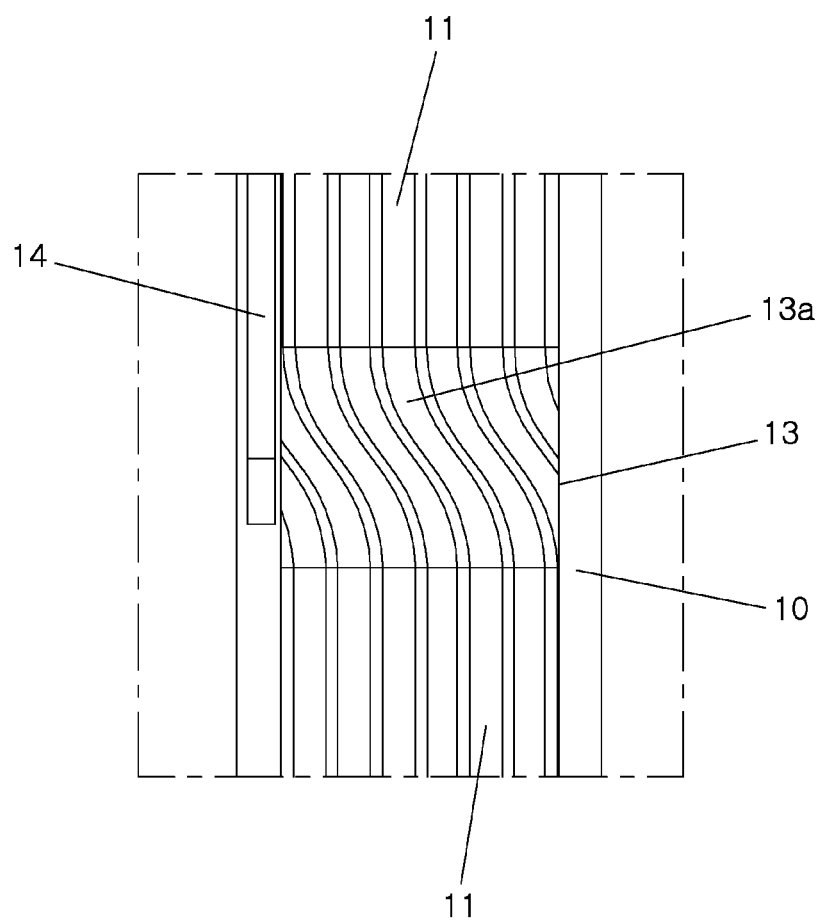
FIG. 6 is a top plan view illustrating an alignment portion in the V-belt pulley capable of adjusting alignment of the V-belt according to the present exemplary embodiment.
Figure 7:
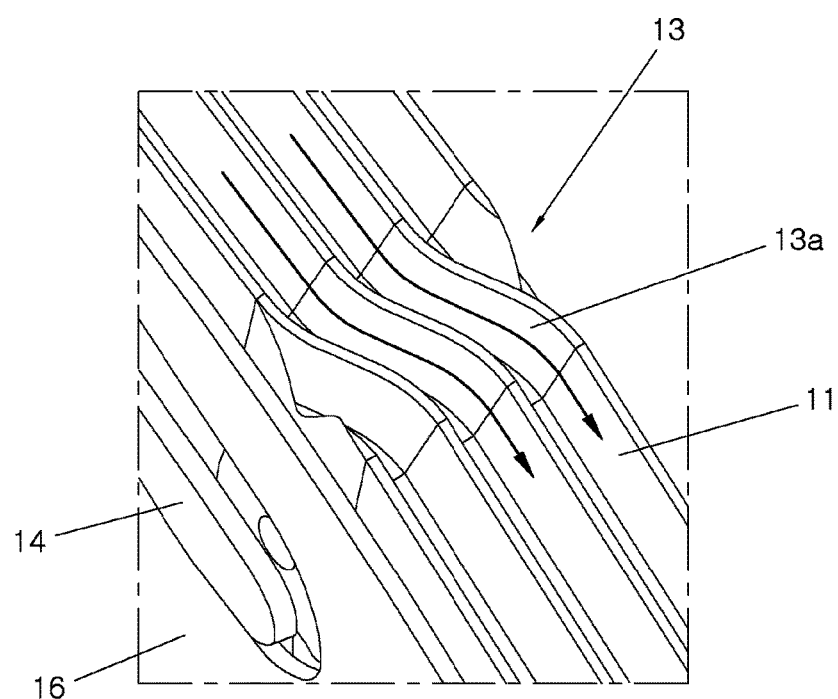
FIG. 7 is a partial enlarged perspective view illustrating the state that a rib guide of the V-belt pulley is connected to an alignment guide of the alignment portion in the V-belt pulley capable of adjusting alignment of the V-belt according to the present exemplary embodiment.

As shown in FIG. 6 and FIG. 7, the alignment guides 13a may be formed such that the rib guide 11 is connected to an adjacent rib guide 11. That is, the rib guides 11 are not connected in a circumferential direction to be cut off by the alignment portion installing groove 12, so that the alignment guides 13a may connect these. Particularly, the alignment guides 13a may connect the rib guides 11 with the other rib guides 11 most adjacent thereto. For example, the left end side rib guide 11 in the V-belt pulley 10 may be connected with the second rib guide 11 on the left side through one of the alignment guides 13a.

One alignment guide 13a may connect with the next rib guide 11 most adjacent thereto, thereby moving the V-belt 20 in a side direction to adjust the alignment state of the V-belt 20.

The alignment portion 13 may be positioned at inside of the alignment portion installing groove 12 when the V-belt pulley 10 and the V-belt 20 are normally aligned, but rise from the inside of the alignment portion installing groove 12 to make the alignment guides 13a and the rib guides 11 to be equal to the heights thereof when the alignment state of the V-belt pulley 10 and the V-belt 20 becomes abnormal.

The alignment guide 13a may be formed in plural and in parallel with each other.

Furthermore, the alignment guides 13a may be formed of the number one small than the rib guides 11. For example, as shown in FIG. 6, there may be three alignment guide 13a when there are four rib guides 11.

A lever 14 may raise the alignment portion 13 when the V-belt 20 is misaligned.

A middle portion of the lever 14 may be hinge-connected to the V-belt pulley 10 so that the lever 14 may rotate around the portion hinge-connected to the V-belt pulley 10.

One end of the lever 14 may be connected to the alignment portion 13 so that the lever may raise the alignment portion 13 through its rotation.

The other end of the lever 14 may be installed in order to be adjacently located to the circumferential surface of the V-belt pulley 10. The other end of the lever 14 may contact the ribs 21 of the V-belt 20 when the V-belt 20 is misaligned. The other end of the lever 14 may have a circular arc shape. The other end of the lever 14 may have a curvature radius about the same as a curvature radius of the V-belt pulley 10, and may be adjacently positioned at the circumferential surface of the V-belt pulley 10 so that the V-belt 20 may immediately contact the other end of the lever 14 when the V-belt 20 is misaligned.

An elastic member 15 may be installed at the alignment portion installing groove 12.

The elastic member 15 may elastically support the alignment portion 13 in order for the alignment portion 13 to be inserted into the alignment portion installing groove 12.

The elastic member 15 may be provided as a coil spring form.

A cover 16 may be engaged at a side surface of the V-belt pulley 10. The cover 16 may cover an opened portion of the alignment portion installing groove 12 in order to prevent the alignment portion 13 and the elastic member 15 from being separated.

Furthermore, the cover 16 may have a groove for accommodating one end of the lever 14. The one end of the lever 14 may be located into the groove to limit a rotation angle of the lever 14. However, the cover 16 is not shown in the drawing excepting FIG. 3 and FIG. 7.

Hereinafter, the operation of the V-belt pulley capable of adjusting alignment of the V-belt having the above configuration will be described.

Figure 3:
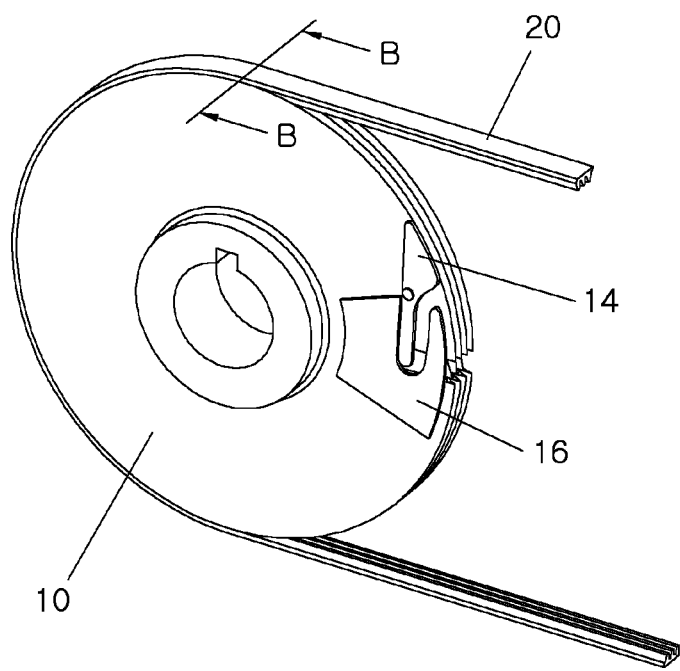
FIG. 3 is a perspective view illustrating a V-belt pulley capable of adjusting alignment of a V-belt and a V-belt according to an exemplary embodiment in the present disclosure.

FIG. 3 illustrates the misaligned state, that is, the V-belt 20 rotates with some ribs 21 of the V-belt 20 being separated to the outside of the V-belt pulley 10. At this time, the V-belt 20 is apart from the alignment corrector, and the cross-sectional view along the line B-B of FIG. 3 is similar to that shown in FIG. 2.

Figure 8:
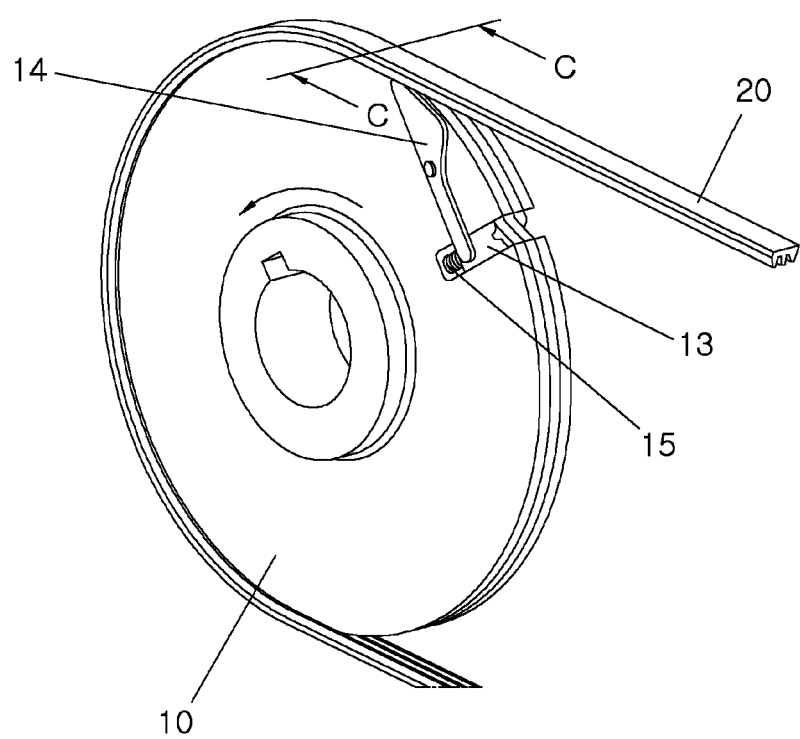
FIG. 8 is a perspective view illustrating the state that the misaligned V-belt starts to contact to a lever in the V-belt pulley capable of adjusting alignment of the V-belt according to the present exemplary embodiment.
Figure 9:
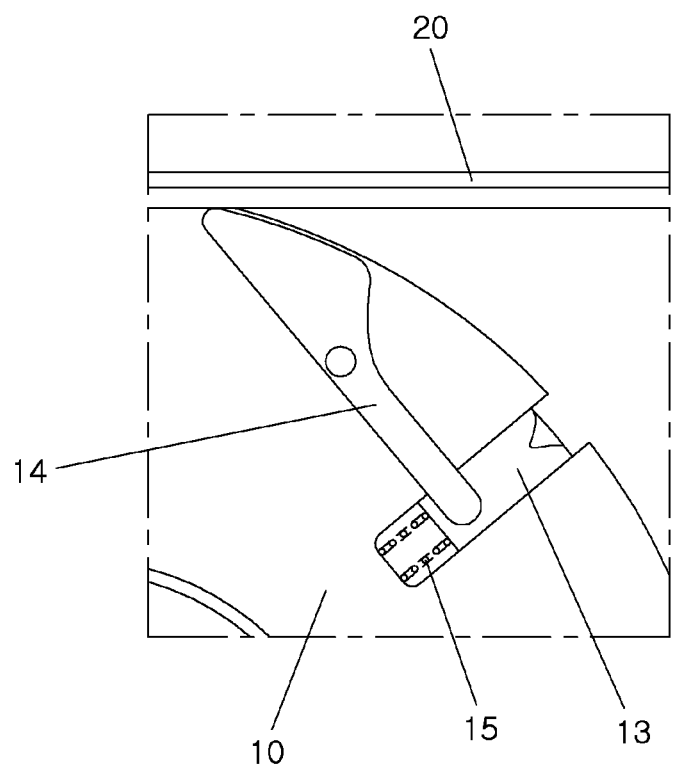
FIG. 9 is a side view illustrating the state that the misaligned V-belt starts to contact to the lever in the V-belt pulley capable of adjusting alignment of the V-belt according to the present exemplary embodiment.
Figure 10:
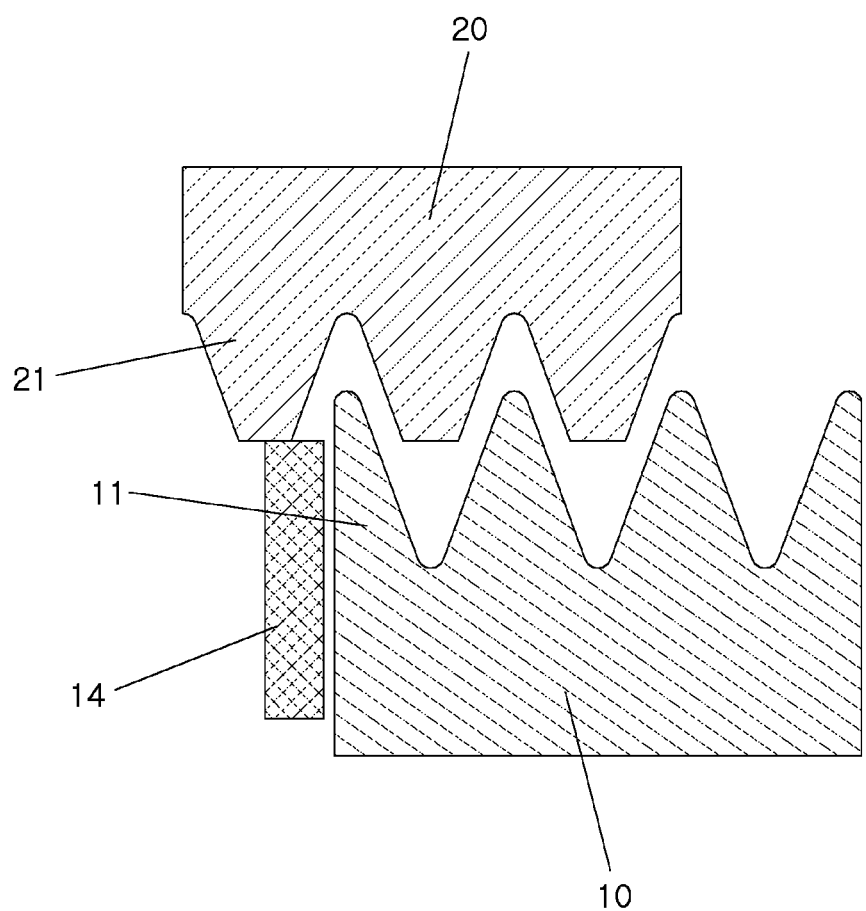
FIG. 10 is a cross-sectional view taken along the line C-C of the FIG. 8.
Figure 11:
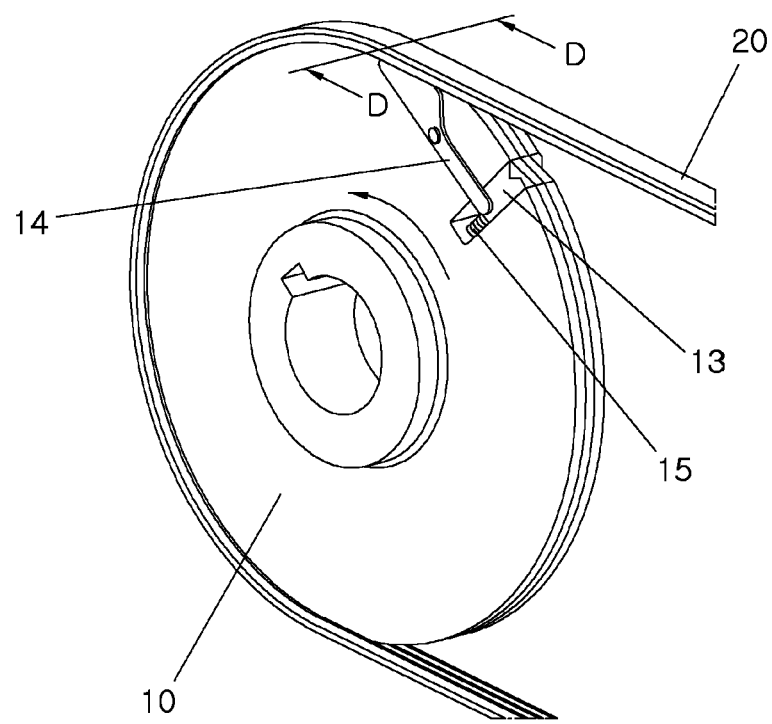
FIG. 11 is a perspective view illustrating the state that the misaligned V-belt operates the lever in the V-belt pulley capable of adjusting alignment of the V-belt according to the present exemplary embodiment.
Figure 12:
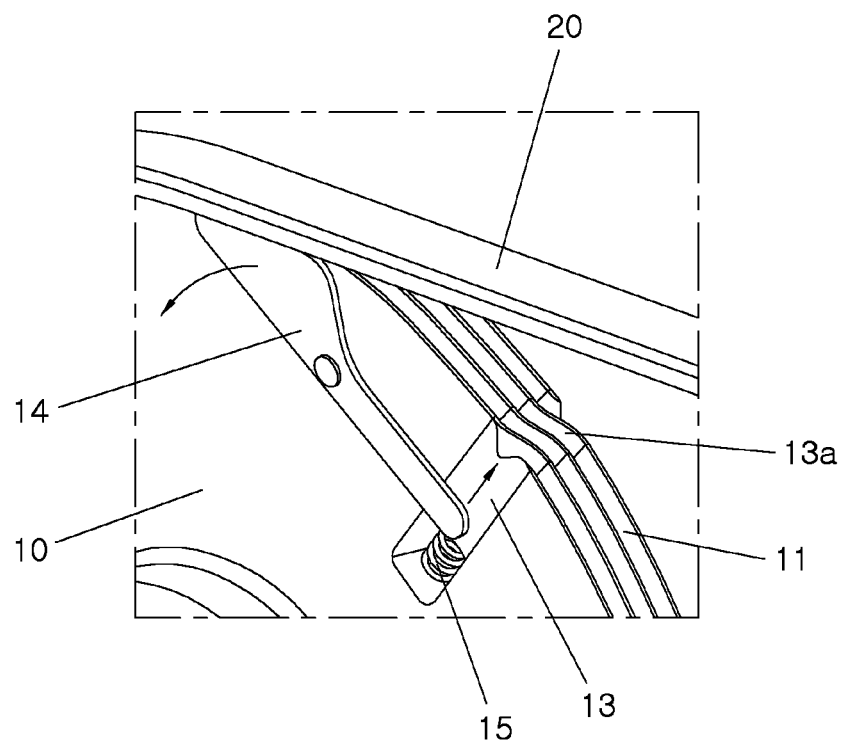
FIG. 12 is a partial enlarged perspective view of FIG. 10.
Figure 13:
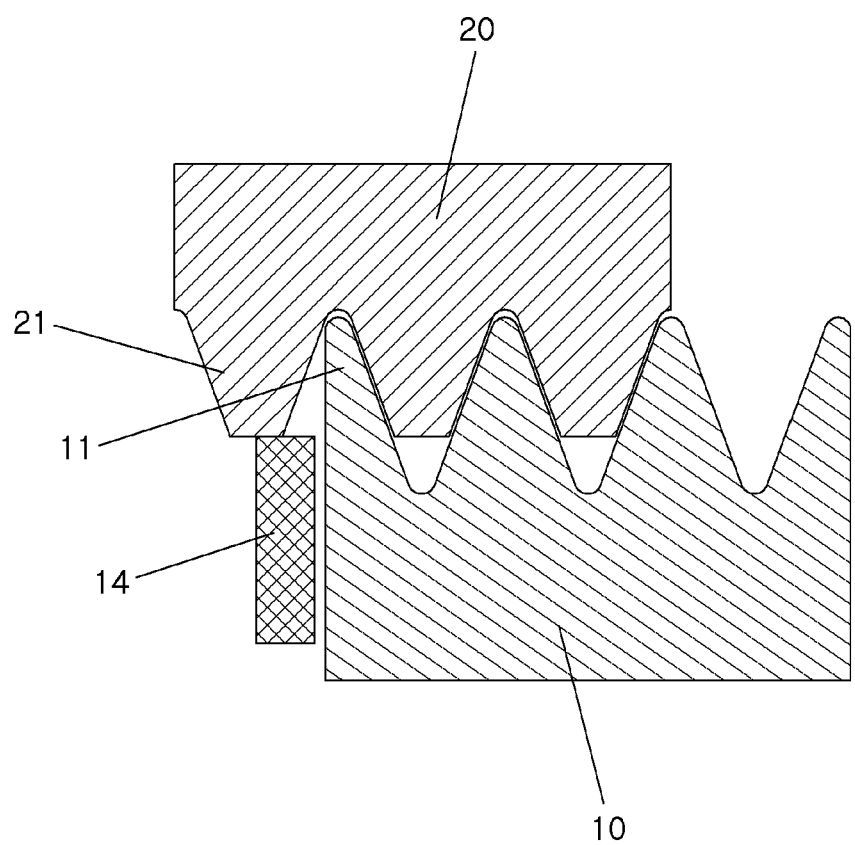
FIG. 13 is a cross-sectional view taken along the line D-D of the FIG. 11.

Thereafter, if the V-belt pulley 10 rotates, as shown in FIG. 8 to FIG. 10, the V-belt 20 begins to contact the other end of the lever 14. The rib 21 located in the outermost of the V-belt 20 contacts the other end of the lever 14 by the V-belt pulley 10.

As shown in FIGS. 11 to 14, if the rotation of the V-belt 20 further progresses with the rib 21 contacting the lever 14, the lever 14 rotates to raise the alignment portion 13. If the V-belt pulley 10 rotates with the rib 21 contacting the lever 14, the rib 21 depresses the other end of the lever 14 such that the lever 14 rotates around the portion hinge-connected with the V-belt pulley 10. Since the other end of the lever 14 rotates in order to turn a center of the V-belt pulley 10, the one end of the lever 14 rotates in order to turn the circumferential surface of the V-belt pulley 10. The alignment portion 13 accommodated in the alignment portion installing groove 12 rises by the rotation of the one end of the lever 14 in order to move toward the circumferential surface of the V-belt pulley 10.

Figure 14:
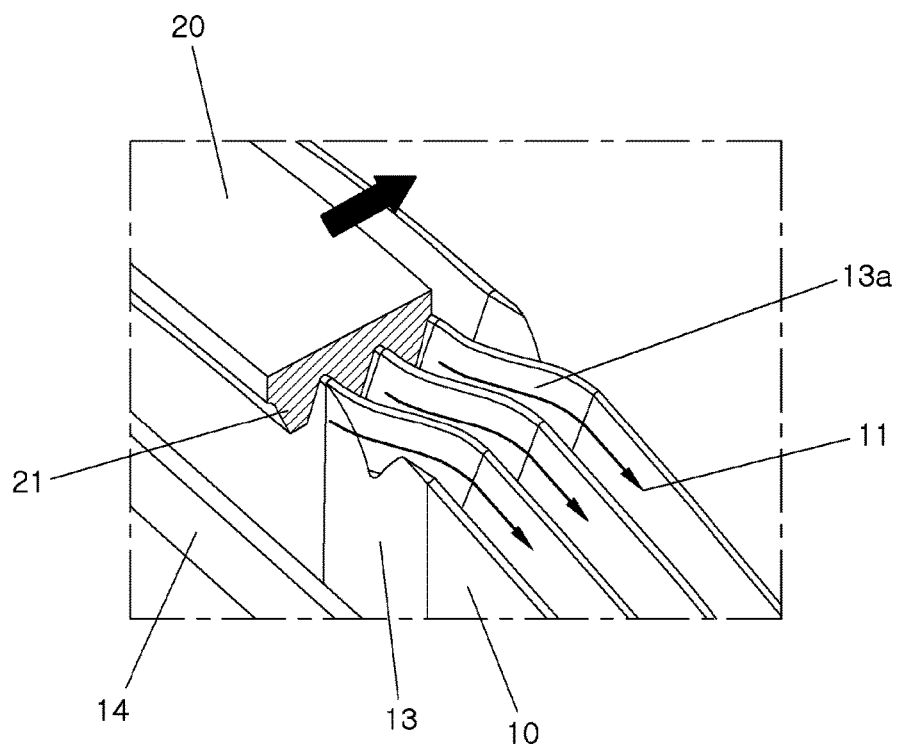
FIG. 14 is a partial enlarged perspective view illustrating the state that the misaligned V-belt moves in a side direction in the V-belt pulley capable of adjusting alignment of the V-belt according to the present exemplary embodiment.
Figure 15:
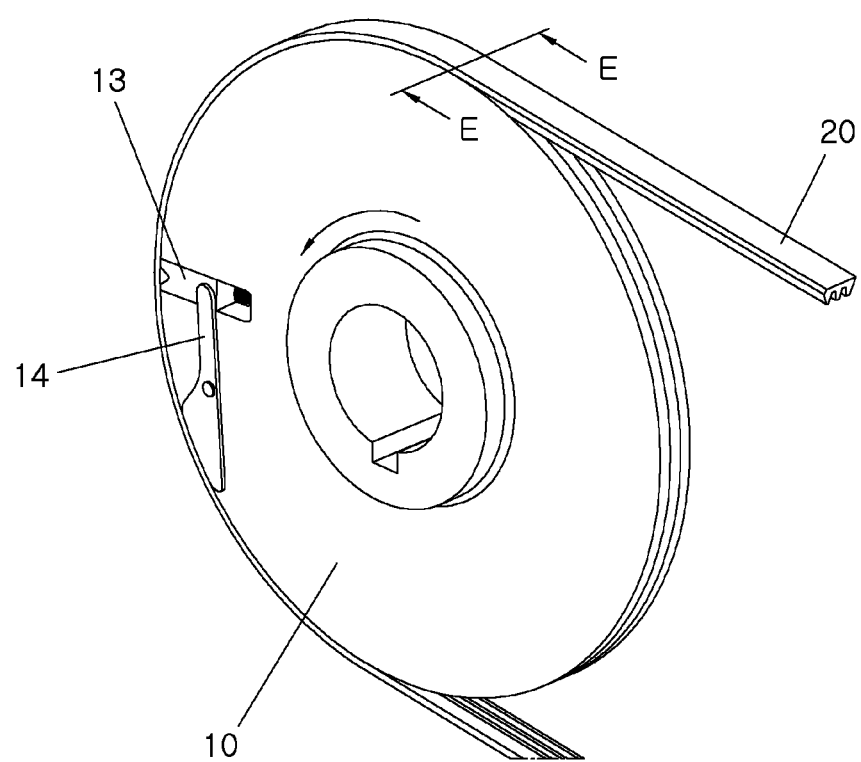
FIG. 15 is a perspective view illustrating the state that the adjusting alignment state of the V-belt is completed in the V-belt pulley capable of adjusting alignment of the V-belt according to the present exemplary embodiment.

If the alignment portion 13 rises, as shown in FIG. 14, since the V-belt 20 moves toward the circumferential surface of the V-belt pulley 10 along the alignment guide 13a, the V-belt 20 may move in a lateral direction. Since the V-belt 20 moves in the lateral direction, the alignment state of the V-belt 20 may be adjusted to result in a properly aligned state.

Figure 16:
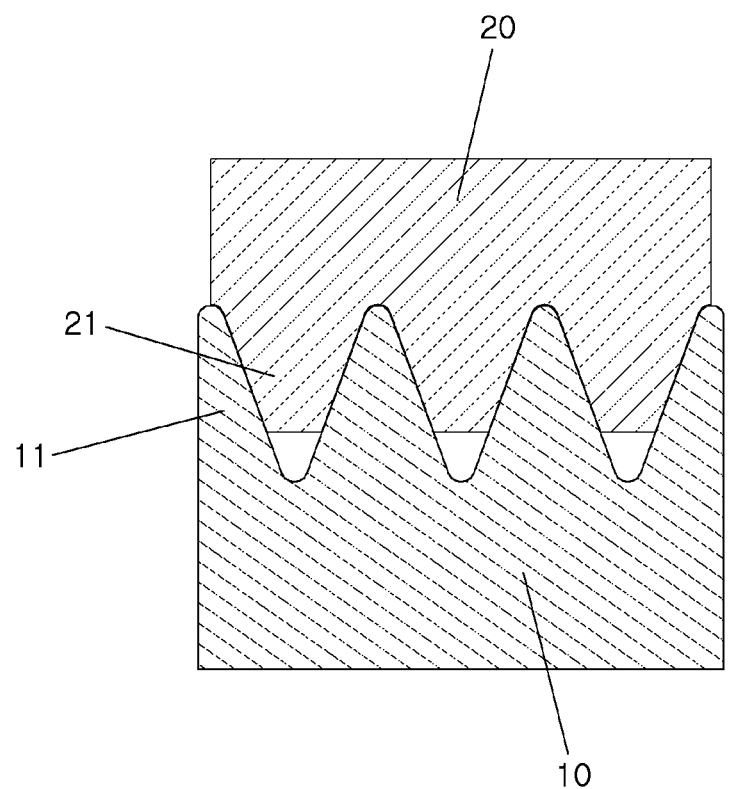
FIG. 16 is a cross-sectional view taken along the line E-E of the FIG. 15.

If the V-belt pulley 10 rotates continuously with the alignment state of the V-belt 20 being properly adjusted with respect to the V-belt pulley 10 as above, the rib 21 rotates continuously while not contacting with the alignment corrector. The cross section at this time, as shown in FIG. 16, is the state that the rib 21 of the V-belt 20 is not separated toward the outside of the V-belt pulley 10 to be normally aligned.

The alignment corrector may be installed in two different positions in the V-belt pulley 10, respectively, and each alignment corrector may be installed in order to adjust the alignment position of the V-belt 20 in a direction different from each other. That is, the alignment portion installing groove 12 may formed at two different positions apart from each other in a circumferential direction of the V-belt pulley 10, respectively, and the alignment portion 13 may be installed in the alignment portion installing groove 12 in a direction different from each other with respect to the alignment guide 13a, and the lever 14 may be installed at different surfaces of the V-belt pulley 10, respectively.

Hence, if the two alignment correctors are installed at the V-belt pulley 10, respectively, the alignment state of the V-belt 20 can be adjusted in both directions of the V-belt pulley 10.

Figure 17:
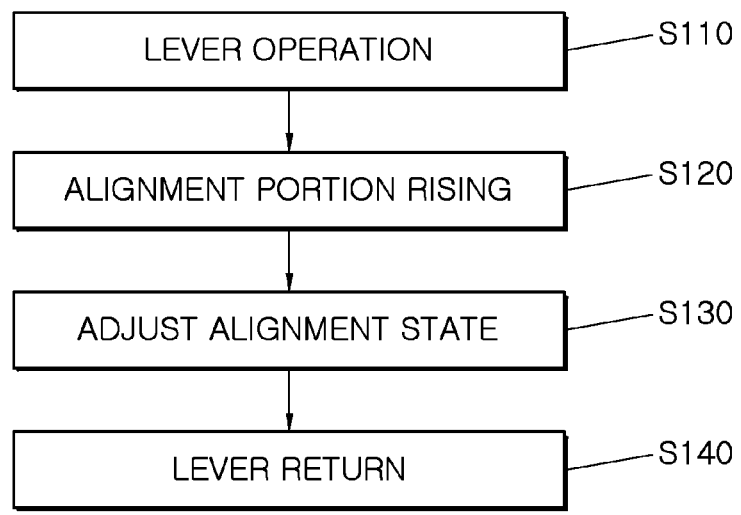
FIG. 17 is a flow chart of a control method of the V-belt pulley capable of adjusting alignment of the V-belt according to the present exemplary embodiment.

FIG. 17 illustrates a control method of a V-belt pulley capable of adjusting an alignment of a V-belt according to another exemplary embodiment in the present disclosure.

The control method of the V-belt pulley capable of adjusting an alignment of the V-belt according to the present exemplary embodiment may include a lever operation step S110 of contacting the misaligned rib 21 of the V-belt 20 with the lever 14 installed at an outside of the V-belt pulley 10 and rotating the lever 14, an alignment portion raising step S120 of raising the alignment portion 13 in the alignment portion installing groove 12 formed at the V-belt pulley 10 by the rotation of the lever 14, an alignment state adjusting step S130 of adjusting the alignment state of the V-belt 20 by that the alignment guide 13a formed at an upper end of the alignment portion 13 moves the V-belt 20 toward inside of the V-belt pulley 10 through the raising of the alignment portion 13, and a lever return step S140 of descending the alignment portion 13 and returning the lever 14 to an original portion thereof when the alignment state of the V-belt 20 is adjusted.

A plurality of ribs 21 are formed at the V-belt 20 and a plurality of rib guides 11 are formed at the V-belt pulley 10 in order to be inserted between the ribs 21. If the rib 21 rotates with misaligned state, that is, the rib 21 located in the outermost among the ribs 21 being located outside of the rib guide 11 positioned in the outermost among the rib guides 11, noise can occur or the V-belt 20 can be damaged. However, as previously described, since the alignment corrector is provided at the V-belt pulley 10, the alignment state of the V-belt 20 can be adjusted.

The lever operation step S110 is the step that the misaligned rib 21 of the V-belt 20 contacts with the lever 14 installed rotatably at the V-belt pulley 10 to rotate the lever 14 when the V-belt 20 relatively rotates with misaligned state with respect to the V-belt pulley 10. If the V-belt 20 rotates with misaligned state, the misaligned rib 21, that is, the rib 21 located outside of the rib guide 11 contacts the other end of the lever 14 installed rotatably at the V-belt pulley 10. Thereafter, if the V-belt 20 rotates continuously, the misaligned rib 21 presses the other end of the lever 14 so that the lever 14 rotates around a portion hinge-connected to the V-belt pulley 10.

The alignment portion raising step S120 raises the alignment portion 13 installed at the V-belt pulley 10 to move up and down by the rotation of the lever 14. Since the alignment portion 13 is installed to move up and down in the alignment portion installing groove 12 formed at the V-belt pulley 10 and contact the lever 14, the alignment portion 13 rises if the lever 14 rotates.

The alignment state adjusting step S130 is the step where the alignment state of the misaligned V-belt 20 is adjusted by the alignment guide 13a formed at the risen alignment portion 13. The alignment guide 13a may be formed at an upper end of the alignment portion 13 so that the rib guide 11 separated by the alignment portion installing groove 12 may be connected with a next adjacent rib guide 11. Therefore, if the alignment portion 13 rises, the V-belt 20 moves along the alignment guide 13a in a lateral direction so that the alignment state of the V-belt 20 can be adjusted.

When the alignment state of the V-belt 20 is adjusted at the lever return step S140, since the power pressing down the lever 14 is extinguished, the alignment portion 13 and the lever 14 can be returned to their original positions, respectively.

Although exemplary embodiments in the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A V-belt pulley comprising:
a plurality of rib guides projected along a circumferential surface of the V-belt pulley; and
an alignment corrector that moves a V-belt in a direction towards an inside of the V-belt pulley when a rib of the V-belt is positioned outside of an outermost rib guide of the plurality of rib guides, and
wherein the alignment corrector comprises: a lever for raising an alignment portion when the V-belt is misaligned and the rib of the V-belt contacts the lever.

2. The V-belt pulley of claim 1, wherein
the alignment portion is installed in an alignment portion installing groove formed at the V-belt pulley to be moved up and down and having an alignment guide for moving the V-belt toward the V-belt pulley.

3. The V-belt pulley of claim 2, wherein the alignment guide in the alignment portion is formed such that a rib guide of the plurality of rib guides is connected to an adjacent rib guide of the plurality of rib guides.

4. The V-belt pulley of claim 3, wherein the alignment guide is formed in plural and a plurality of alignment guides are arranged to be parallel to each other.

5. The V-belt pulley of claim 4, wherein a number of the plurality of alignment guides is one smaller than a number of the plurality of rib guides.

6. The V-belt pulley of claim 2, wherein an elastic member is installed at the alignment portion installing groove and elastically supports the alignment portion in a direction of descending the alignment portion.

7. The V-belt pulley of claim 2, wherein a middle portion of the lever is hinge-connected to a side surface of the V-belt pulley, a first end portion of the lever is connected to the alignment portion and a second end portion is located adjacent to the circumferential surface of the V-belt pulley.

8. The V-belt of claim 7, wherein the circumferential surface of the second end portion of the lever has a circular arc shape and contacts the rib of the V-belt when the rib is located outside of the V-belt pulley.

9. The V-belt pulley of claim 2, further comprising a cover having a groove accommodating the first end portion of the lever to limit the rotation of the lever and being engaged outside of the V-belt pulley.

10. The V-belt pulley of claim 1, wherein the alignment corrector is provided at two positions apart from each other along the circumferential direction of the V-belt pulley, and installed to move the V-belt in directions opposite to each other.

11. The V-belt pulley of claim 10, wherein the lever is installed at opposite sides of the V-belt pulley, respectively, and a plurality of alignment guides of the alignment portion are formed to move the V-belt in directions opposite to each other.

* * * * *